(12) United States Patent
Holley

(10) Patent No.: US 8,072,729 B1
(45) Date of Patent: Dec. 6, 2011

(54) BATTERY-SPARK AND REVERSE POLARITY PROTECTION METHOD AND CIRCUIT FOR SAFELY CONNECTING A TROLLING MOTOR TO A POWER SOURCE

(75) Inventor: Steven E. Holley, Cushing, OK (US)

(73) Assignee: Brunswick Corporation, Lake Forest, IL (US)

( * ) Notice: Subject to any disclaimer, the term of this patent is extended or adjusted under 35 U.S.C. 154(b) by 427 days.

(21) Appl. No.: 12/474,484

(22) Filed: May 29, 2009

(51) Int. Cl.
*H01H 9/00* (2006.01)
*H01H 47/00* (2006.01)
*H01H 47/18* (2006.01)
*H01H 51/30* (2006.01)
*H02J 7/04* (2006.01)
*H02J 7/16* (2006.01)
*H02J 7/00* (2006.01)

(52) U.S. Cl. .......................... 361/195; 320/165; 320/166
(58) Field of Classification Search .................... 361/195
See application file for complete search history.

(56) References Cited

U.S. PATENT DOCUMENTS

| 5,069,642 | A | | 12/1991 | Henderson |
| 5,292,269 | A | | 3/1994 | Plost et al. |
| 5,892,338 | A | * | 4/1999 | Moore et al. ............... 318/16 |
| 5,909,064 | A | * | 6/1999 | Feil et al. .................. 307/141 |
| 5,910,690 | A | * | 6/1999 | Dorsey et al. ............. 307/141 |
| 6,054,831 | A | | 4/2000 | Moore et al. |

* cited by examiner

*Primary Examiner* — Dharti Patel
(74) *Attorney, Agent, or Firm* — Andrus, Sceales, Starke & Sawall, LLP

(57) ABSTRACT

The protection method and circuit provide a time delay after a first contact with the power source is made until full power is allowed connection to the trolling motor. This time delay is longer than the "bounce" time, or the time a user may "bounce" a contact on and off of a battery terminal, during a typical batter connection. Therefore, this delay prevents sparking at the battery terminal. During the time delay, an initial pre-charge brings the main capacitor's voltage up to the battery voltage in a low stress, no spark process prior to being connected directly across the battery source terminal by relay contacts.

27 Claims, 7 Drawing Sheets

US 8,072,729 B1

BATTERY-SPARK AND REVERSE POLARITY PROTECTION METHOD AND CIRCUIT FOR SAFELY CONNECTING A TROLLING MOTOR TO A POWER SOURCE

FIELD

The present application is directed to the field of trolling motors. More specifically, the present application is directed to the field of power control circuit design in trolling motors.

BACKGROUND

In current systems, when a trolling motor is connected to a power source such as a battery, and the trolling motor is on or otherwise presents a load to the battery, a surge current may flow and may create sparks at the battery terminals while the user is securing the terminal connections. The trolling motor presents a load to the battery when the motor controller is in the "on" position or the motor controller has a power up sequence which does not clear the load condition for several seconds or more. The main capacitors that are connected directly across the battery supply terminals are such, and must be charged. These main capacitors present a power up charging problem because they require almost zero series resistance with them to be effective when shuttling current from battery to motor in PWM modes of speed control.

Sparks from surge currents as described above, when connecting a trolling motor, can create a high risk condition for igniting fuel fumes that are typically associated with boat fuel tanks and gasoline engines. Typically, the boat batteries are located in the same area as fuel tanks, thus increasing the risk. Sparking can also damage trolling motor controllers and operator confidence.

SUMMARY

The protection method and circuit provide a time delay after a first contact with the power source is made until full power is allowed connection to the trolling motor. This time delay is longer than the "bounce" time, or the time a user may "bounce" a contact on and off of a battery terminal, during a typical batter connection. Therefore, this delay prevents sparking at the battery terminal. During the time delay, an initial pre-charge brings the main capacitor's voltage up to the battery voltage in a low stress, no spark process prior to being connected directly across the battery source terminal by relay contacts.

DETAILED DESCRIPTION

The circuit and method of the application solves the surge sparking problem by providing a time delay between the first incident of power connection and the final secure connection to the power source or battery, or "bounce time". During the time a user makes a secure connection to the battery terminal, a series of connection bounces are created. By providing a time delay that is longer than the bounce time, the connection bounce takes place before allowing full power to the trolling motor. During the same time delay, the main capacitors are pre-charging at a controlled rate that will not create sparking at the battery terminals.

Figure 1:
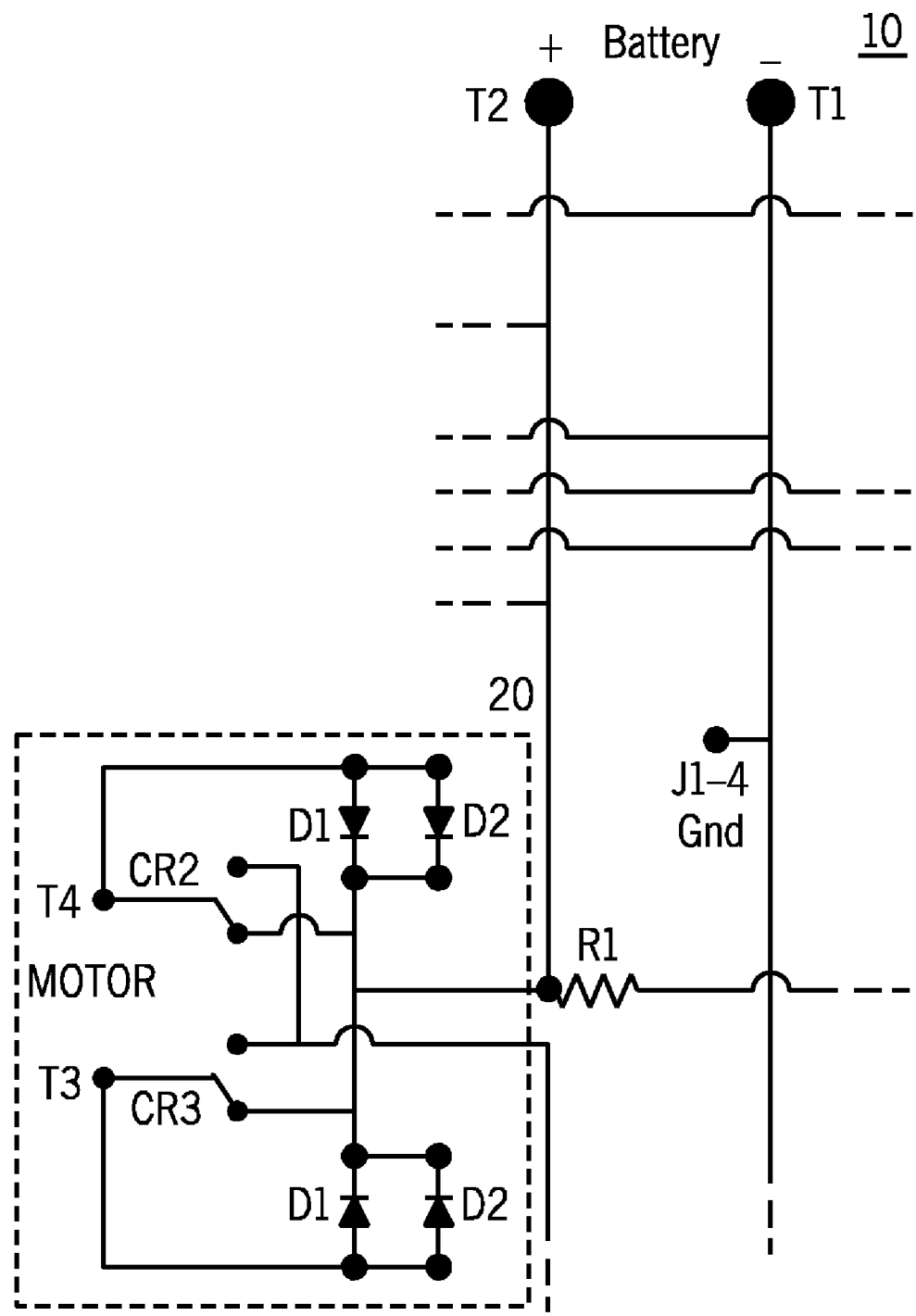
FIG. 1 is a schematic diagram illustrating a typical portion of a power control circuit.

Referring first to FIG. 1, a typical power control circuit 10 is illustrated. Here, the sparking or arcing issues that arise from connecting the battery terminals T1, T2 of a trolling motor power control circuit 10 to a battery are shown. The motor terminals T3 and T4 are connected with the motor of the trolling motor, and therefore require a large amount of current, thus causing sparking when a user attempts to connect the battery cables of the power control circuit 10 to the battery terminals T1, T2. Sparking typically occurs during a "bounce time", initiated when a user touches one of the cables to the battery terminal, and concludes when the cables are actually secured onto the terminals. It is understood that the bounce time may include additional intermittent, temporary connections between the cables in terminals T1, T2 prior to the cables being secured to the terminals T1, T2. It has been found that once the bounce time is initiated, sparks may occur between the cables and the terminals T1, T2 at any time the cables are not actually touching the terminals T1, T2.

Figure 2A:
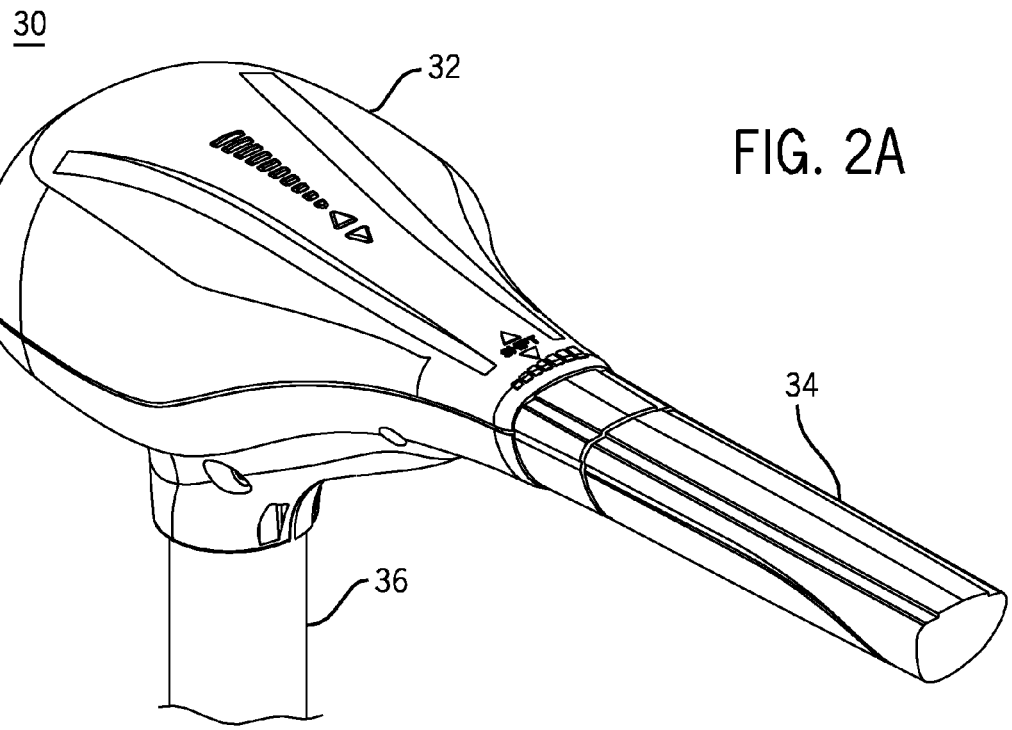
FIG. 2 is a graphical representation illustrating a trolling motor head assembly incorporating an embodiment of the power control circuit of the present application.
Figure 2B:
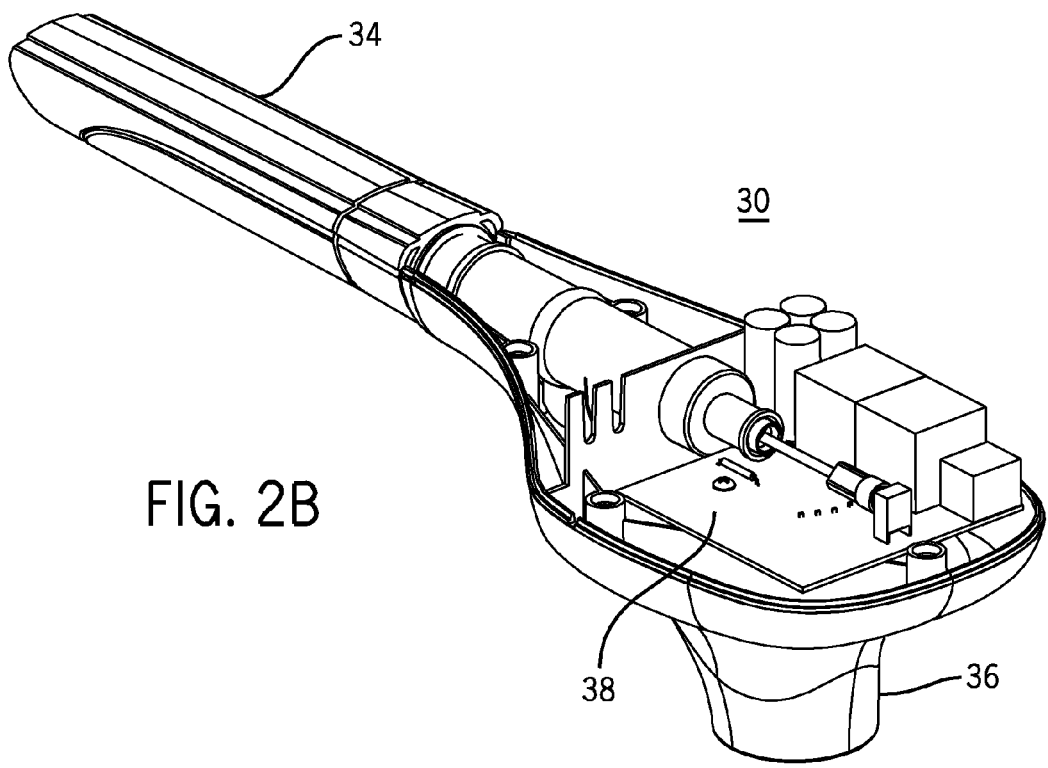

Referring now to FIGS. 2A and 2B, a graphical illustration of a controller head assembly 30 is depicted to illustrate where such a power control circuit 100 of the present application is located in a trolling motor. Here, a throttle handle 34 allows the user to control the trolling motor, and a controller head cover 32 protects the controller board 38 from damage. The column 36 facilitates the connection between the controller board 38 and the motor (not shown). It should be noted that in this depicted embodiment, the controller board 38 is located in the head of the controller head assembly 30. While this is the preferred embodiment, it is contemplated that the controller board, including the power control circuit of the present application, may be located in other portions of the trolling motor that may be practical to one skilled in the art.

Referring now to FIG. 2B, the controller head assembly 30 is shown without the controller head cover 32, and the controller board 38 including the power control circuit is situated such that the motor terminals T3, T4 may be connected to the controller board 38 through the column 36 of the trolling motor.

Figure 3:
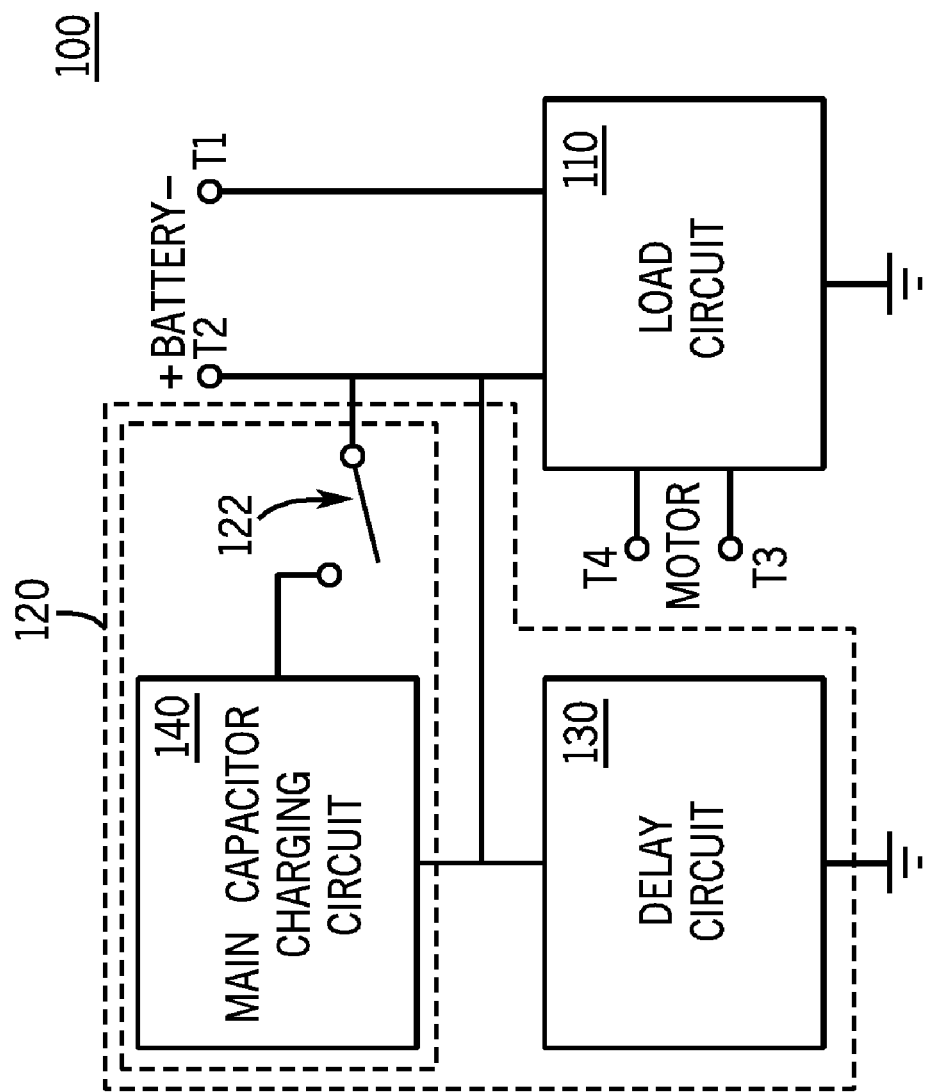
FIG. 3 is a schematic block diagram illustrating an embodiment of the power control circuit of the present application.

Referring now to FIG. 3, a schematic block diagram illustrating the power control circuit 100 of the present application is depicted. Here, the load circuit 110 connected to the motor terminals T3, T4 is connected to battery terminals T1, T2. To avoid sparking between the battery cables and the battery terminals T1, T2 during connection, a power control switch 122 is open while the charging circuit 140 charges a set of main capacitors (not shown). During this charging time, delay circuit 130 prevents the power control switch 122 from closing, thus preventing battery spark between the cables and the battery terminals T1, T2. At the end of the delay, preferably longer than the bounce time required for the user to connect the cable to the battery terminals T1, T2, the switching circuit 120, including the charging circuit 140 and the delay circuit 130, closes the power control switch 122, thus providing current flow from the battery terminals T1, T2 to the load circuit 110, including the motor terminals T3, T4.

Figure 4A:
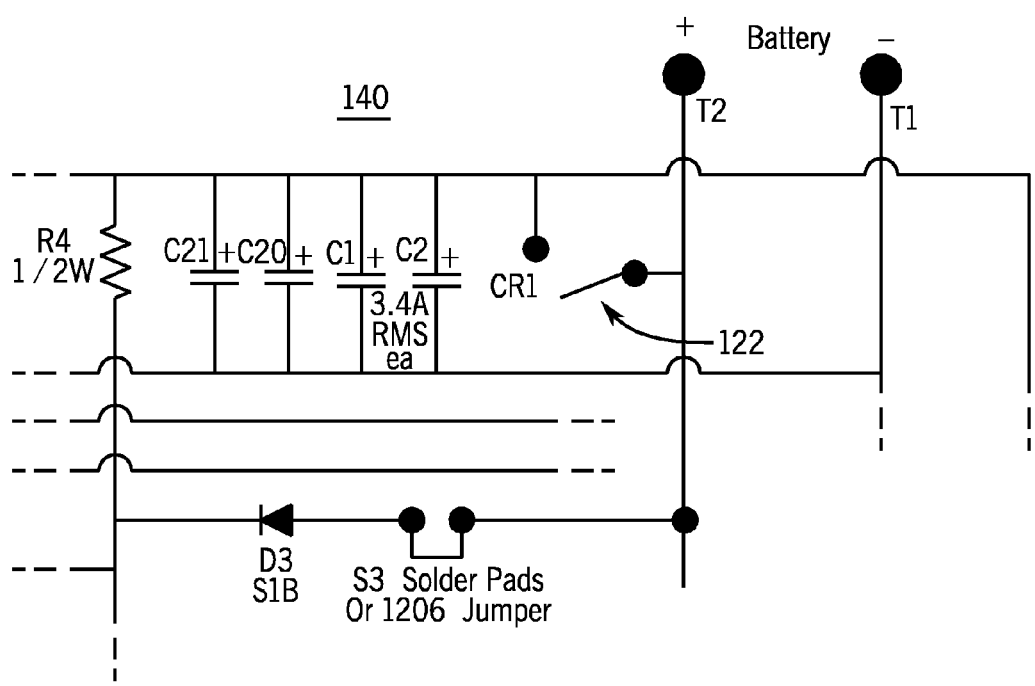
FIGS. 4A-4C are schematic diagrams illustrating an embodiment of the power control circuit of the present application.

FIG. 4A is a more detailed illustration of an embodiment of the charging circuit 140 according to the present application. As discussed previously, and as will be further explained with respect to the entire power control circuit 100, the main capacitors C1, C2 are charged through the charging diode D3 and the charging resistor R4 while the power control switch 122 (a normally open switch of the CR1 relay) is open during the delay period. Once again, once the battery cables are secured to the battery terminals T1, T2, the power control switch closes having fully charged the main capacitors C1, C2. It should also be noted that the charging diode D3 also protects the main capacitor C1, C2 from reverse battery connection.

Preferably, the main capacitors C1, C2 are preferably charged to approximately 90% of a final value. This typically occurs in 300 milliseconds. Once the power control switch 122 is closed, the charging diode D3 and charging resistor R4 are bypassed, and a direct connection from the battery terminals T1, T2 to the main capacitors C1, C2 is achieved.

Figure 4B:
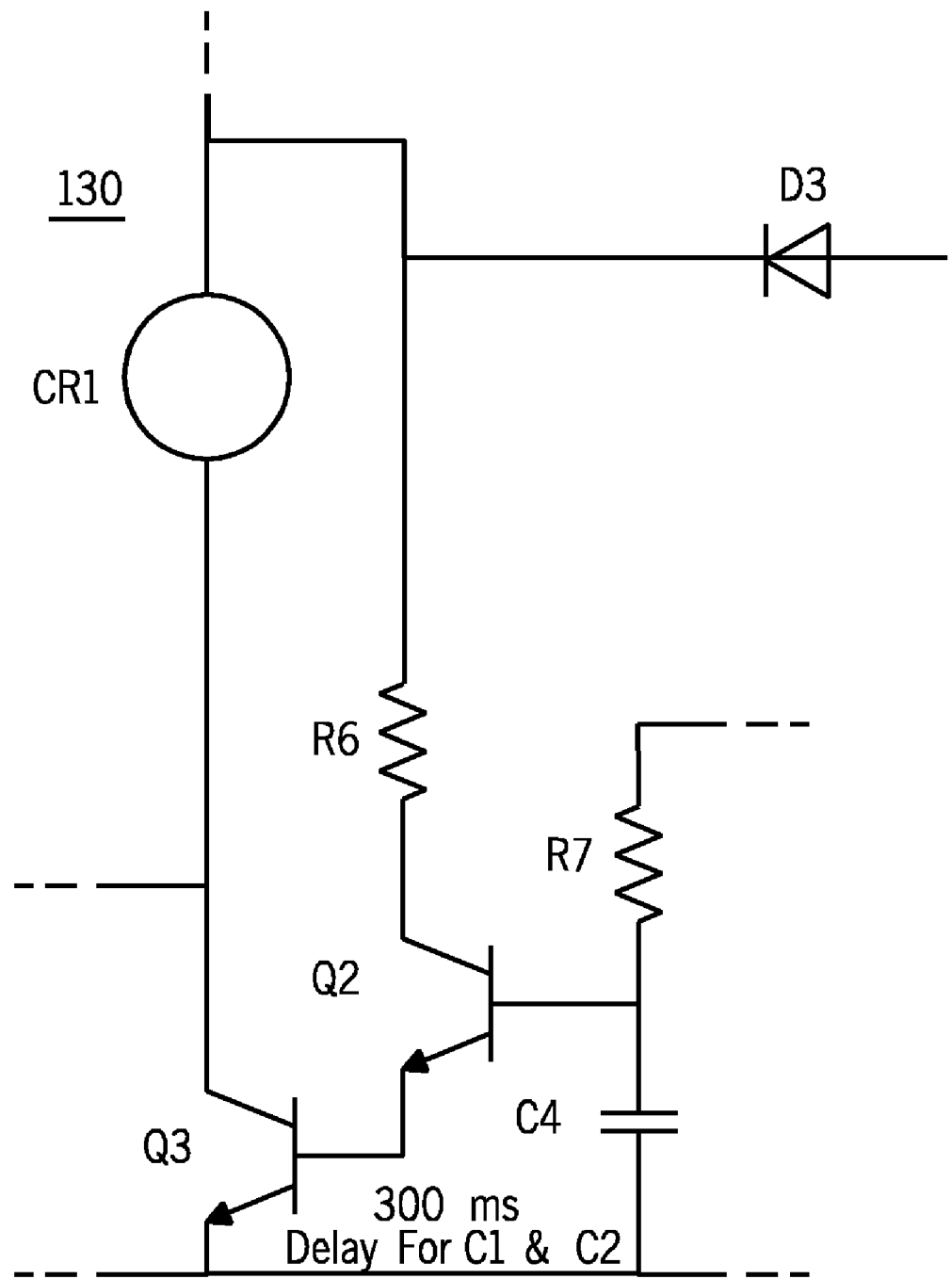

FIG. 4B illustrates a delay circuit 130 according to a preferred embodiment of the present application. Once again, as the bounce time is initiated, current through the diode D3 charges the transistors Q2 and Q3 up to their threshold voltage, at which time the transistors Q2, Q3 drive the coil of relay CR1, thus closing the normally open power control switch 122 (FIG. 4A). This use of a delay circuit 130 produces an acceptable delay time before the main capacitors C1, C2 (not shown) are connected to the battery terminals T1, T2. Preferably, appropriate transistors Q2, Q3 and the remaining components of the delay circuit 130, including timing capacitor C4 and timing resistors R6 and R7, are utilized such that a 300 millisecond delay occurs. This preferred delay period should allow for a user of the motor to secure the battery cable to the battery terminals T1, T2. It should be recognized that the delay time for driving the coil of relay CR1 may be shortened or lengthened by adjusting the values of the components in the delay circuit 130. Specifically, one skilled in the art would be able to adjust the delay time to be shorter or longer than 300 milliseconds by utilizing different transistors Q2, Q3, as well as varying values for the delay resistors R6, R7 and capacitor C4. As a practical matter, it should be noted that shortening the delay time for driving the coil of relay CR1 may make the delay time shorter than the bounce time, thus possibly causing sparking as the user attempts to connect the battery cables to the battery terminals T1, T2. Furthermore, lengthening the delay time may interfere with the user operating the motor, as the delay time may be lengthened as long as the number of seconds. Presumably, lengthening the delay time to this extent would not only allow the user to connect the battery cables to the terminals T1, T2, but would also run into the user attempting to operate the trolling motor with an external foot switch.

Figure 4C:
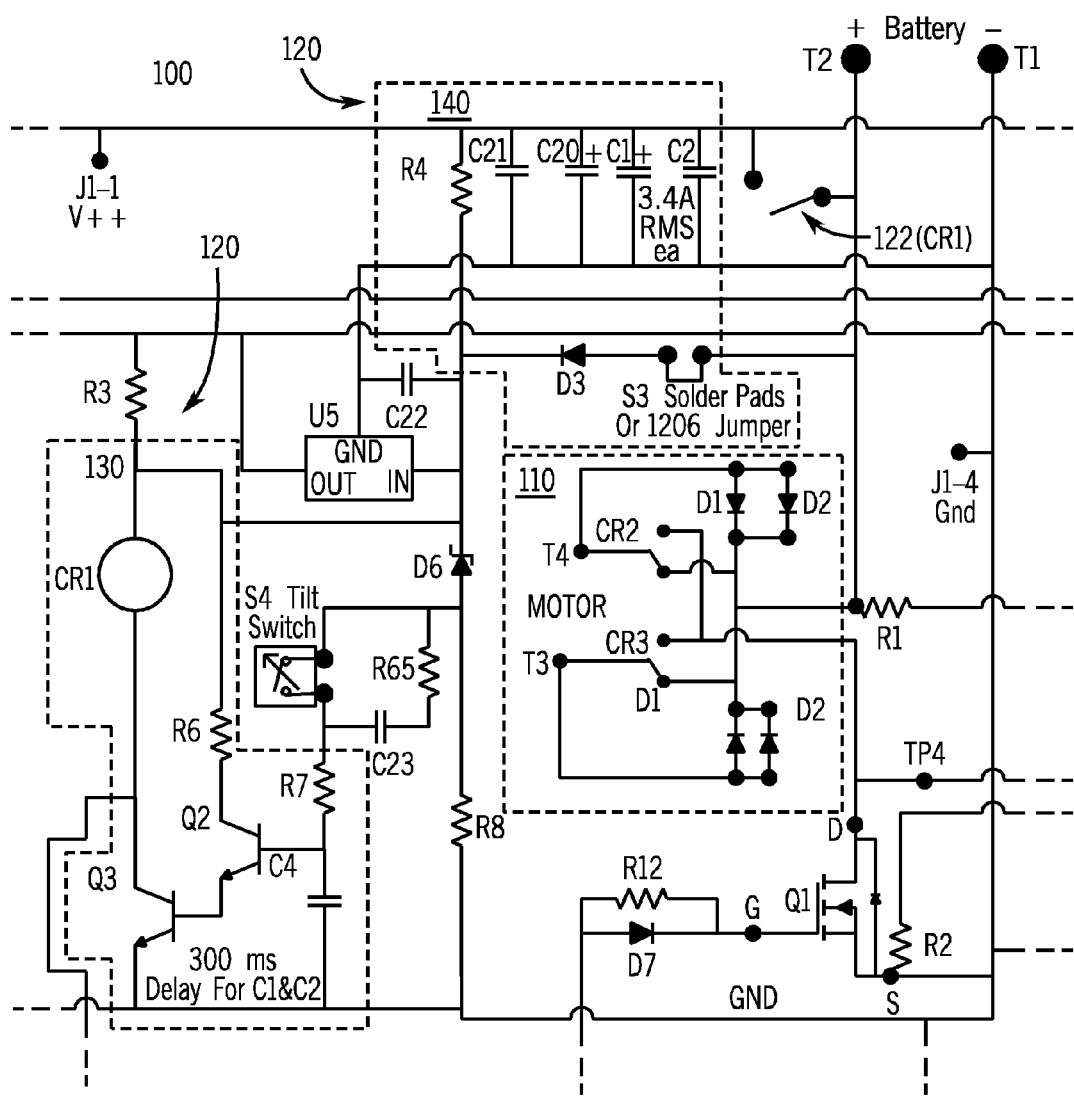

An exemplary, complete power control circuit 100 is shown in FIG. 4C. This is a low cost circuit that creates a power-up delay to prevent connection sparking when the battery cables are connected to the terminals T1, T2. It should be noted that the applicant has provided some values for certain components of the power control circuit 100 of the present application. These provided values are exemplary of a preferred value for any of the given components, and it should be understood that those skilled in the art may substitute other components having varying values that would still allow the power control circuit 100 to function as herein described. The power control switch 122 of control relay CR1 in FIG. 4C provides power to the motor relays CR2 and CR3 of the load circuit, and provides the DC continuity between the main capacitors C1, C2 and the battery source terminals T1, T2. CR1 relay operation is delayed by the circuit components R6, R7, R8, D3, D6, C4, Q2 and Q3. When the battery terminal T1, T2 connection is of the correct polarity, then current will flow through delay diode D3, zener diode D6, timing resistor R7, and timing capacitor C4. The zener diode D6 provides for motor operation only above approximately 9 volts of battery voltage. When the current through timing resistor R7 charges timing capacitator C4 to the bias voltage required to turn on Q2 and Q3 where Q2 and Q3, are connected in high-gain Darlington arrangement, then CR1 will turn on and supply power to the motor relays CR2, CR3 (coils not shown), and connect main capacitors C1, C2 to the main battery terminals T1, T2 by throwing the power control switch 122.

Charging time will vary somewhat with battery voltage but allows time for the user to make the battery connection. The actual time of the delay is an integral of $CR/(Vb-Vc)$ where C=capacitance (fixed), R=resistance (fixed), Vb=battery voltage, and Vc=capacitor voltage. During connection, "bounce" Vb will switch between 0 and full battery voltage. A longer "bounce" time will result in a longer integrate time and a longer delay for applying motor power and the possibility of battery sparking.

During the delay time, main capacitors C1, C2 are charging from zero to the full battery voltage by receiving current through D3 and R4. During the time allowed for battery connection, the main capacitors C1, C2 can approach the full battery voltage with the current limited by R4. This current is extremely low compared to a sudden connection of the main capacitors C1, C2 to the battery T1, T2 without R4 limiting the current. R4 is only useful for the initial pre-charge because if R4 remained in series with the main capacitors C1, C2, then the effectiveness of the main capacitors C1, C2 to shuttle high AC current between the motor T3, T4 and battery T1, T2 would be defeated. After the delay time is over, CR1 coil is energized and CR1 contacts (power control switch 122) close, which provide a high current connection between the battery terminals T1, T2 and the main capacitors C1, C2. The very low resistance of CR1 contacts (power control switch 122) will bypass the higher R4 resistance and enable the function of the main capacitors C1 C2 to shuttle high values of AC current between motor T3, T4 and battery T1, T2.

The main capacitors C1, C2 are also protected from reverse polarity connecting of the battery cable to the battery by the user. Without reverse battery protection, the main capacitors C1, C2 would be damaged with reversed voltage applied. If the battery cable is connected in reverse polarity, then diode D3 will lock the voltage and prevent the timing and precharging from taking place. When normal operation does not start, the user will eventually realize the reverse connection and correct the polarity.

Referring still to FIG. 4c, a tilt switch S4 is further electrically coupled to R7 of the delay circuit 130, and to the charging circuit 140 through zener diode D6. The tilt switch is configured to turn the throttle off in the trolling motor when the tilt switch reaches a predetermined angle for a predetermined delay period of time. Preferably, the tilt switch is set to a minimum angle (that is, the angle at which a shut off of the throttle occurs) of 45 degrees from an operating position at which the column is in a vertical position (or the controller head is at a horizontal position). It is contemplated that the tilt switch may be set to read a change of any angle amount from this operating position, but the useful range of such a tilt switch occurs at a minimum of 45 degrees and a maximum of 75 degrees from the operating position. Restated, the sensing function of the tilt switch is based on tilt angle of the trolling motor. The tilt switch may include, but is not limited to, a MEMS tilt switch, a rolling ball switch, or other means available that sense when a specific angle for operating the trolling motor has been exceeded. The tilt switch S4 is physically fastened on the top side of the controller board 38, and includes a sufficient delay in activation so as to prevent false shut offs due to vibration in the boat, or large waves.

Figure 5:
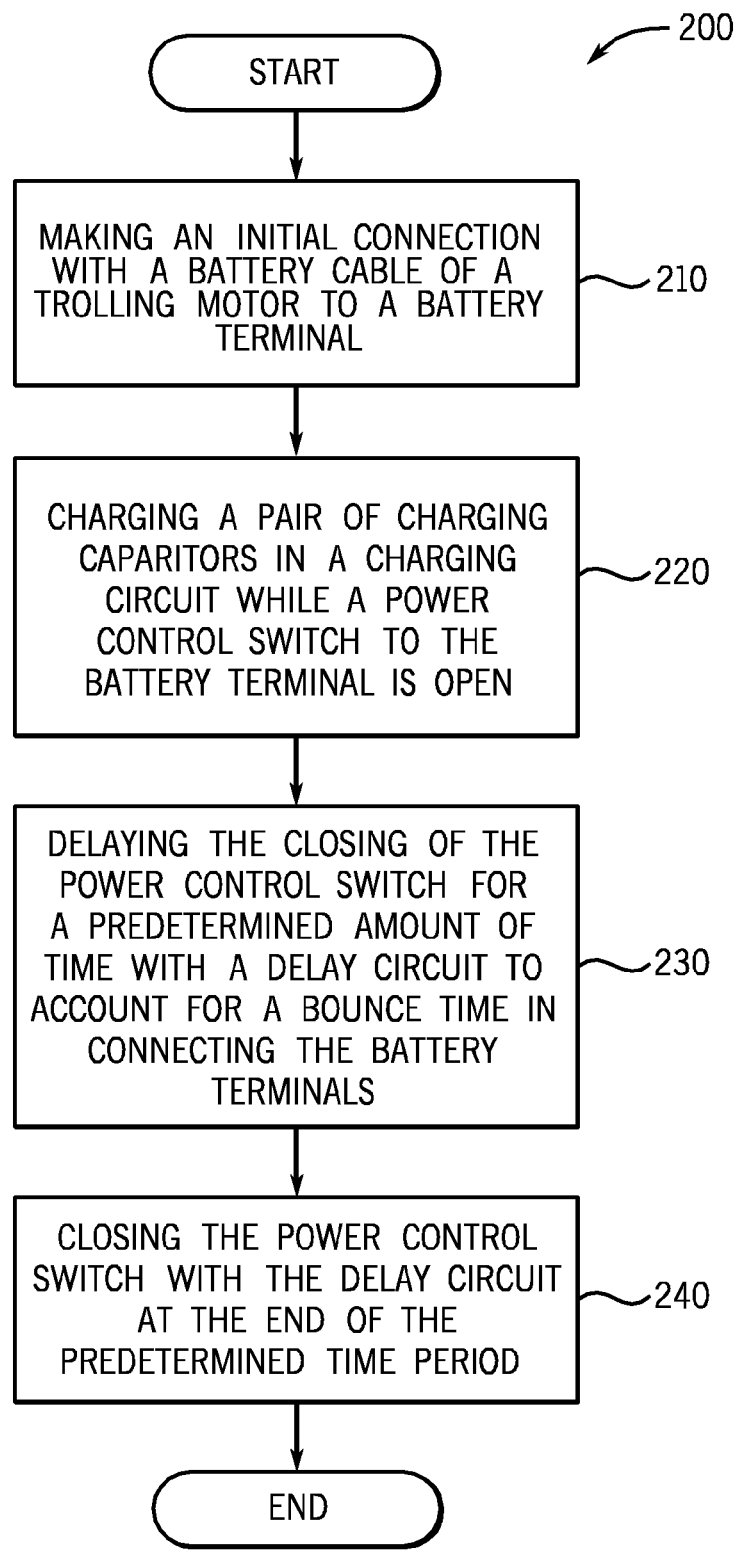
FIG. 5 illustrates a flowchart according to an embodiment of the method of the present invention.

Referring now to FIG. 5, a method 200 of preventing battery spark when connecting a trolling motor to a battery with a power control circuit is illustrated.

In step 210, a battery cable of a trolling motor is connected to a battery terminal. This initial connection initiates a bounce time and in step 220, a pair of charging capacitors and a charging circuit are charged while power control switch to the battery terminal is open. In step 230, the closing of the power control switch is delayed for a predetermined amount of time with a delay circuit to account for bounce time in connecting the battery terminals. Lastly, in step 240, the power control switch is closed with the delay circuit after the predetermined time period elapses. This method 200 prevents sparking from the cable to the battery terminal by delaying the closing of the power control switch until the bounce time has ended.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A power control circuit for providing battery spark and reverse polarity protection in a trolling motor, the power control circuit comprising:
    a power control switch, a first pole of the power control switch electrically coupled to a positive battery cable of the trolling motor, the power control switch in a normally open position;
    a charging circuit electrically coupled to a second pole of the power control switch, the charging circuit further coupled to the positive battery cable, wherein when the positive battery cable makes an initial contact with a positive battery terminal, a pair of main capacitors in the charging circuit begin charging; and
    a delay circuit electrically coupled to the positive battery cable, wherein the delay circuit closes the power control switch after a predetermined time delay after the initial contact.

2. The power control circuit of claim 1, wherein the charging circuit pre-charges the pair of main capacitors through a charging diode and a charging resistor.

3. The power control circuit of claim 2, wherein the charging diode prevents reverse polarity current from reaching the pair of main capacitors.

4. The power control circuit of claim 1, wherein the charging circuit charges the pair of main capacitors to 90 percent of maximum before the power control switch is closed.

5. The power control circuit of claim 1, wherein the delay circuit closes the power control switch 300 milliseconds after the initial contact.

6. The power control circuit of claim 1, wherein the delay circuit further includes a relay coil and a pair of transistors connected in a high-gain, darlington configuration such that the pair of transistors drive the relay coil to close the power control switch when the pair of transistors reach a threshold voltage.

7. The power control circuit of claim 6, wherein the delay circuit further includes a timing resistor and a timing capacitor, wherein a current through the timing resistor charges the timing capacitor to a bias voltage required to turn on the pair of transistors.

8. The power control circuit of claim 6, wherein the pair of transistors further drive the relay coil to supply power to a pair of motor relays.

9. The power control circuit of claim 1, wherein the charging and delay circuits are implemented on a controller board located in a controller head assembly.

10. The power control circuit of claim 1, further including a tilt switch electronically coupled with the delay and charging circuits, the tilt switch turns off a throttle of the power control circuit when the trolling motor is tilted at a minimum tilt angle from an operating position.

11. The power control circuit of claim 10, wherein the minimum tilt angle is in a range of forty-five to seventy-five percent.

12. The power control circuit of claim 10, wherein the tilt switch is physically coupled to a top surface of the controller board.

13. The power central circuit of claim 1, wherein a time delay from the initial contact to after the bounce time is an integral of CR/(Vb−Vc), wherein C is a fixed capacitance, R is a fixed resistance, Vb is a battery voltage and Vc is a delay capacitor voltage.

14. A method of preventing battery spark when connecting a trolling motor to a battery, the method comprising:
    making an initial connection with a battery cable of a trolling motor to a battery terminal;
    charging a pair of main capacitors in a charging circuit while a power control switch to the battery terminal is open;
    delaying the closing of the power control switch for a predetermined amount of time with a delay circuit, wherein the predetermined amount of time is greater than a bounce time; and
    closing the power control switch with the delay circuit at the end of the predetermined time period.

15. The method of claim 14, wherein the charging circuit charges the pair of main capacitors through a charging diode and a charging resistor.

16. The method of claim 15, wherein the charging diode prevents reverse polarity current from reaching the pair of main capacitors.

17. The method circuit of claim 14, wherein the charging circuit charges the pair of main capacitors to 90 percent of maximum before the closing step.

18. The method of claim 14, wherein the delay circuit effectuates the closing step 300 milliseconds after the initial contact.

19. The method of claim 14, comprising driving a relay coil and with a pair of transistors in the delay circuit, wherein the pair of transistors are connected in a high-gain, darlington configuration when the pair of transistors reach a threshold voltage.

20. The method of claim 19, further comprising charging a timing capacitor in the delay circuit to a bias voltage required to turn on the pair of transistors with a current through a timing resistor.

21. The method of claim 19, further comprising driving the relay coil to supply a pair of motor relays with the pair of transistors.

22. The method of claim 14, wherein the charging and delay circuits are implemented on a controller board located in a controller head assembly.

23. The method of claim 14, further comprising coupling a tilt switch electronically with the delay in charging circuits, wherein the tilt switch turns off the throttle of the power control circuit when the trolling motor is tilted at a minimum tilt angle from an operating position.

24. The method of claim 23, wherein the minimum tilt angle is in a range of forty-five to seventy-five percent.

25. The method of claim 23, wherein the tilt switch is physically coupled to a top surface of the controller board.

26. The method of claim 14, wherein a time delay from the initial contact to after the bounce time is an integral of CR/(Vb−Vc) wherein C is a fixed capacitance, R is a fixed resistance, Vb is a battery voltage and Vc is a delay capacitor voltage.

27. A delay circuit for providing a time delay to avoid a bounce time when connecting a pair of trolling motor battery cables to a battery, the delay circuit comprising:

a relay coil, wherein the relay coil controls a position of a power control switch, the power control switch being in a normally open position and electrically coupled between a positive battery cable of the trolling motor and a charging circuit; and a pair of transistors connected in a high-gain darlington configuration that are turned on when a current through a timing resistor charges a timing capacitor to a bias voltage, wherein the pair of transistors reach a threshold voltage and drive the relay coil to close the power control switch, thus connecting a load to the battery terminals and avoiding the bounce time.

* * * * *